(12) United States Patent
Juzkow

(10) Patent No.: US 11,127,995 B2
(45) Date of Patent: Sep. 21, 2021

(54) LIGHTWEIGHT THERMAL ADSORPTION STRUCTURE FOR LITHIUM-ION MODULE

(71) Applicant: NIO USA, Inc., San Jose, CA (US)

(72) Inventor: Marc W. Juzkow, Livermore, CA (US)

(73) Assignee: NIO USA, Inc., San Jose, CA (US)

( * ) Notice: Subject to any disclaimer, the term of this patent is extended or adjusted under 35 U.S.C. 154(b) by 195 days.

(21) Appl. No.: 16/145,446

(22) Filed: Sep. 28, 2018

(65) Prior Publication Data

US 2020/0106143 A1 Apr. 2, 2020

(51) Int. Cl.
| | |
|---|---|
| *H01M 10/659* | (2014.01) |
| *H01M 10/613* | (2014.01) |
| *H01M 10/625* | (2014.01) |
| *H01M 10/0525* | (2010.01) |

(52) U.S. Cl.
CPC ..... *H01M 10/659* (2015.04); *H01M 10/0525* (2013.01); *H01M 10/613* (2015.04); *H01M 10/625* (2015.04)

(58) Field of Classification Search
CPC ............. H01M 10/659; H01M 10/613; H01M 10/625; H01M 10/0525
See application file for complete search history.

(56) References Cited

U.S. PATENT DOCUMENTS

2013/0183566 A1 7/2013 Wayne et al.
2014/0370354 A1* 12/2014 Yang .................. H01M 10/623
429/120

FOREIGN PATENT DOCUMENTS

WO WO 2016/120857 8/2016

OTHER PUBLICATIONS

"PCC™ Thermal Management," AllCell Technologies LLC, 2014, retrieved from http://www.allcelltech.com/index.php/technology/pcc-thermal-management, 2 pages.

* cited by examiner

Primary Examiner — Jane J Rhee
(74) Attorney, Agent, or Firm — Sheridan Ross P.C.

(57) ABSTRACT

An energy storage device and structure for energy storage cells is provided that includes a plurality of energy storage cells. Each of the energy storage cells has an upper side and a lower side. The plurality of energy storage cells are arranged in a pattern with each energy storage cell being spaced apart from one another. The upper sides of each of the energy storage cells are adjacent to one another. A phase change composition (PCC) material has through holes arranged in the pattern. A portion of each of the energy storage cells is positioned within a respective through hole. A lightweight material is adjacent to the PCC material and surrounds at least another portion of each of the energy storage cells. The PCC material is closer to the upper side of the energy storage cells than the lightweight material.

14 Claims, 13 Drawing Sheets
(1 of 13 Drawing Sheet(s) Filed in Color)

LIGHTWEIGHT THERMAL ADSORPTION STRUCTURE FOR LITHIUM-ION MODULE

FIELD

The present disclosure is generally directed to energy storage devices, in particular, toward batteries and battery modules for electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles, and the demand for high performance batteries has increased.

Vehicles employing at least one electric motor and power system store electrical energy in a number of on board energy storage devices. These energy storage devices are generally arranged in the form of electrically interconnected individual battery modules containing a number of individual battery cells. Important features of the energy storage devices include their integrity and reliability and the ability to fast charge. However, fast charge can lead to excessive heat that is generated inside the cells, which can damage the energy storage devices and lead to reduced energy density and cell life, for example.

Therefore, there is a need to develop methods and systems for improved thermal structures for cells. The present disclosure satisfies these and other needs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
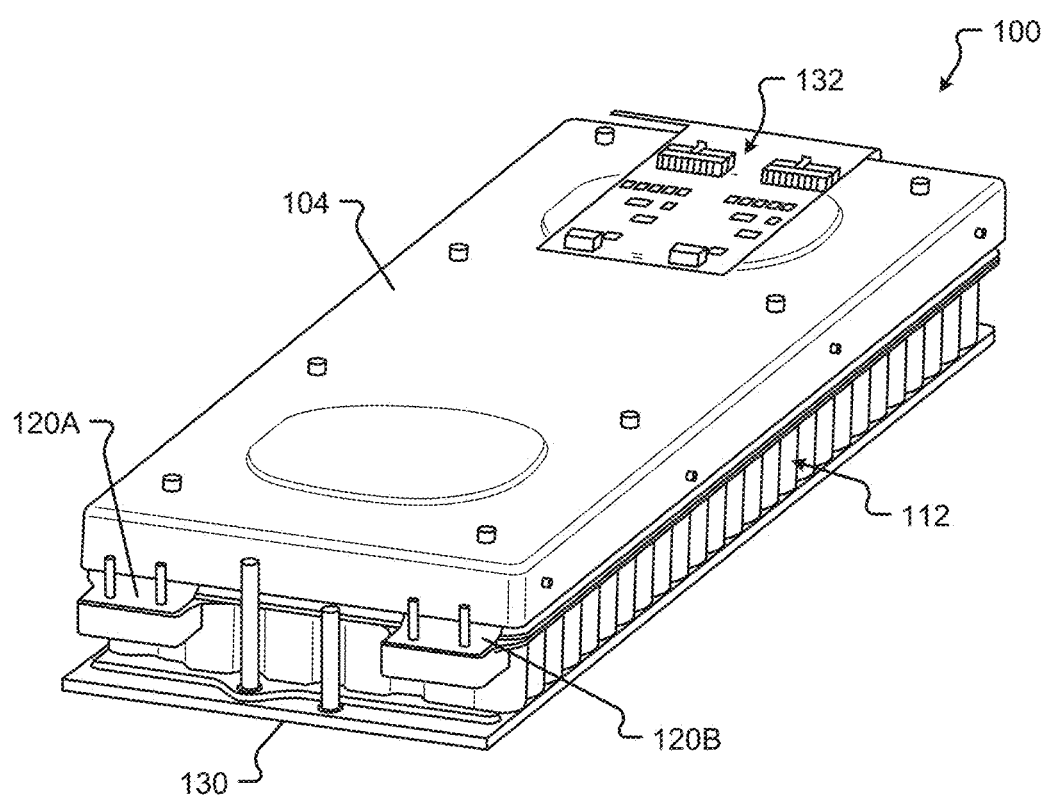
FIG. 1 shows a perspective view of a battery module in accordance with embodiments of the present disclosure.

Individual cells are arranged within a structure, generally resembling a honeycomb or matrix, inside of a battery module. However, as cells are charged or fast charged, heat generated during the charging process can negatively affect the cells if the cells become too hot. This is why charging, and in particular fast charging, of battery modules can lead to reduced battery (cycle and calendar) life. To reduce the amount of heat generated during charging, continuous heat transfer between cells limiting cell temperatures within the module is desired. Currently, various designs are used to hold the cells within the module. For example, structures with a honeycomb design can be used that are pre-formed structures where the lithium-ion cells are inserted into the open holes within the structure. Also, a framework can be placed around the cells where the framework is filled in with a thermally conductive, electrically insulating foam. Various materials may be used for the structure surrounding the cells, including the honeycomb design and fill material in any type of framework.

Phase change materials (PCMs) are substances that have a high heat of fusion and are capable of storing and releasing large amounts of thermal energy. Heat is absorbed or released when the PCM changes from solid to liquid and liquid to solid. Thus, when PCMs reach their phase change temperature, they absorb large amounts of heat at an almost constant temperature. Phase change composite (PCC) materials are a combination of PCM and a material that contains the PCM, such as graphite.

PCC materials can be used as the structure to hold individual cells within a module. When using PCC materials, the lithium-ion cells in the battery module are in direct contact with the PCC material. As the cells heat up during charging, the PCC material spreads heat evenly throughout the module to prevent hot spots within the module. If the temperature reaches the melting point of the PCM, additional thermal energy is absorbed by the melting process. In doing so, the PCC material remains solid despite the melting of the PCM. Thus, PCC materials have conventionally been used in battery modules to dissipate heat generated during charging.

However, a major impediment to the widespread use of PCC materials in lithium-ion battery modules is the added mass that adversely affects the gravimetric energy density of the battery system. It is generally advantageous to increase the gravimetric energy density of cells and battery modules (as this value directly translates to the gravimetric energy density of battery packs) by increasing the capacity of the cells and/or module in comparison to their weight to improve the performance of the battery (e.g., by improving the performance of the cells and/or module). Increases in gravimetric energy density have conventionally been difficult to achieve. Reasons for this include the fact that it can be difficult to decrease the weight of the battery module. As the battery is also one of the largest, heaviest, and most expensive single components of an electric vehicle, any reduction in size and/or weight can advantageously have significant cost savings.

Embodiments of the present disclosure will be described in connection with electrical energy storage devices, and in some embodiments, in connection with the construction and structure of components making up a battery module.

Although embodiments described herein may be described with respect to an electric vehicle, the present disclosure is not so limited. Various embodiments of the present disclosure can apply to any type of machine using a battery, for example mobile machines including but not limited to, vertical takeoff and landing vehicles, aircraft, spacecraft, watercraft, and trains, among others.

An electrical energy storage device for a vehicle may include at least one battery including a number of battery modules electrically interconnected with one another to provide electromotive force for the electrical drive system of a vehicle to operate. Each battery module in the at least one battery can include any number of battery cells contained and/or arranged within a structure. Conventional battery modules may include a structure or components that are designed to maximize the number of battery cells contained therein. As can be appreciated, due to the size of these conventional types of structures surrounding the cells, problems include the fact that the cells can generate too high of temperatures, causing damage to the cells, and that the structures holding the cells can be heavy.

Further, if the structure surrounding the cells is created from an injectable material, there are additional problems; for example, the manufacturing process may be time-consuming (including the necessity of mixing the liquid and requiring human operators for the mixing and injection), error-prone (the liquid may solidify before being uniformly distributed), dirty (due to spilling and the amounts of equipment required), and costly.

The present disclosure describes a battery module including a battery cell structural support system made up of a PCC material and a lightweight material. In some embodiments, the present disclosure describes a method of forming a battery module including a PCC material layer and a lightweight material layer, where each of the PCC material layer and the lightweight material layer are integrally formed pieces, e.g., they may each be formed as a single piece. In embodiments, each of the PCC material layer and the lightweight material layer are pre-formed as separate pieces and then stacked together before the cells are inserted within.

Certain embodiments of the present disclosure relate to a layer of PCC material and a layer of lightweight material each surrounding portions of the cells, where the PCC material layer is stacked on top of the lightweight material layer so that the PCC material is adjacent to an upper portion of a cell (e.g., closer to the header when the cell is in a vertical position with the header positioned at the top of the cell) and the lightweight material is adjacent to a lower portion of a cell. In certain aspects, the PCC material layer may be a PCM. The PCC material may be adjacent to only side surface areas that correspond to the locations of the headers of the cells with the lightweight material being adjacent to the remaining portion of the side surface areas of the cells.

In some embodiments, the battery module may include a lower layer of lightweight material and an upper layer of PCC material, both of the lower and upper layers being configured to surround one or more battery cells packed in an arrangement. The PCC material may be located at a top or upper portion of the cells and the lightweight material may be location at a lower portion of the cells underneath the top portion. The PCC material and the lightweight material may be directly adjacent to one another and provide uniform contact with side surface areas of the cells.

The lower portion may be a majority of the side surface area of the cells. In the disclosure herein, the term "lower" refers to a part of the cell that is lower than an upper, or top, portion of the cell. Thus, the lower portion of the cell may include portions of the cell that are close to, or directly adjacent to, the header of the cell as long as they are underneath the top portion. The term "bottom" as used herein refers to a part of the cell that is opposite the top of the cell.

In various embodiments, the battery module may include an upper layer of PCC material and a lower carrier (also referred to herein as a housing) filled with a lightweight material (e.g., foam), with both of the upper layer and the lightweight material configured to surround the sides of one or more battery cells packed in an arrangement. The PCC material may be directly adjacent to one or both of the carrier and the lightweight material. In some embodiments, the carrier may comprise an internal void inside of which the cells are disposed, and a structural foam or other structural adhesive, may be injected between the battery cells within the internal void of the carrier. Portions of a housing of the module and portions of the PCC material may function as portions of the carrier for the lightweight material. The PCC material may be permanently interconnected to the lightweight material and/or the carrier via a structural foam and/or adhesive.

In some aspects, the compositions of the materials and the amounts of the materials of the PCM and/or PCC material may be chosen based on a tradeoff between the weight of the material(s) and/or a desired weight of the module and desired thermal properties. For example, the amount(s) of PCM and/or PCC material may be chosen based on a desired thermal profile of the cells, such as an amount required to keep the temperature at the top of the cell within a specified different from a temperature at a lower location on the cell, or to keep the temperatures throughout the cell substantially uniform. Thus, the amount(s) of PCM and/or PCC material may be chosen to prevent hot spots within the cell. In addition, the amount(s) of PCM and/or PCC material may be based on a desired gravimetric energy density of the battery module which would limit the desirability of added mass (e.g., amounts of the PCM and/or PCC material in excess of what is required to obtain the desired thermal profile).

In other aspects, the configurations of the PCM and/or PCC material may be chosen based on the tradeoff between the weight of the material and desired thermal properties. The volumes chosen for each of the PCM/PCC material and the lightweight material may be based on a desired gravimetric energy density of the battery module. Thus, configurations of the PCM and/or PCC material together with the lightweight material may be based on balancing the need to obtain the desired temperatures within all areas of the cells (in particular, the headers of the cells) with the need to improve the gravimetric energy density of the battery module, e.g., by lowering a weight of the module.

In some aspects, the compositions of the materials and the amounts of the materials of the PCM and/or PCC material may be chosen based on a tradeoff between the weight of the material(s) and/or a desired weight of the module and desired thermal properties together with desired electrical properties. Thus, configurations of the PCM and/or PCC material together with the lightweight material may be based on balancing the need for electrical insulation (e.g., by use of material(s) that are electrical insulators) with the need to obtain the desired temperatures within all areas of the cells (in particular, the headers of the cells) with the need to improve the gravimetric energy density of the battery module, e.g., by lowering a weight of the module.

FIG. 1 shows a perspective view of a battery module 100 in accordance with embodiments of the present disclosure. The battery module 100 shown in FIG. 1 includes an upper shield 104 configured to substantially cover battery cell interconnects (not shown), battery cells 112, and other electrical connections (e.g., first and second battery module busbars 120A, 120B, etc.). In some embodiments, the upper shield 104 may correspond to a drip shield. In any event, the upper shield 104 may be made from molded, formed, or otherwise shaped plastic, dielectric, or nonconductive material. In one embodiment, the battery management system (BMS) 132 electronics (e.g., printed circuit board, chips, etc.) may be mounted to an exterior or interior surface of the upper shield 104. As shown in FIG. 1, the BMS 132 and corresponding electronics are mounted to an exterior surface (e.g., a surface separate and spaced apart from the battery cells 112 and battery cell interconnects, etc.).

Figure 2:
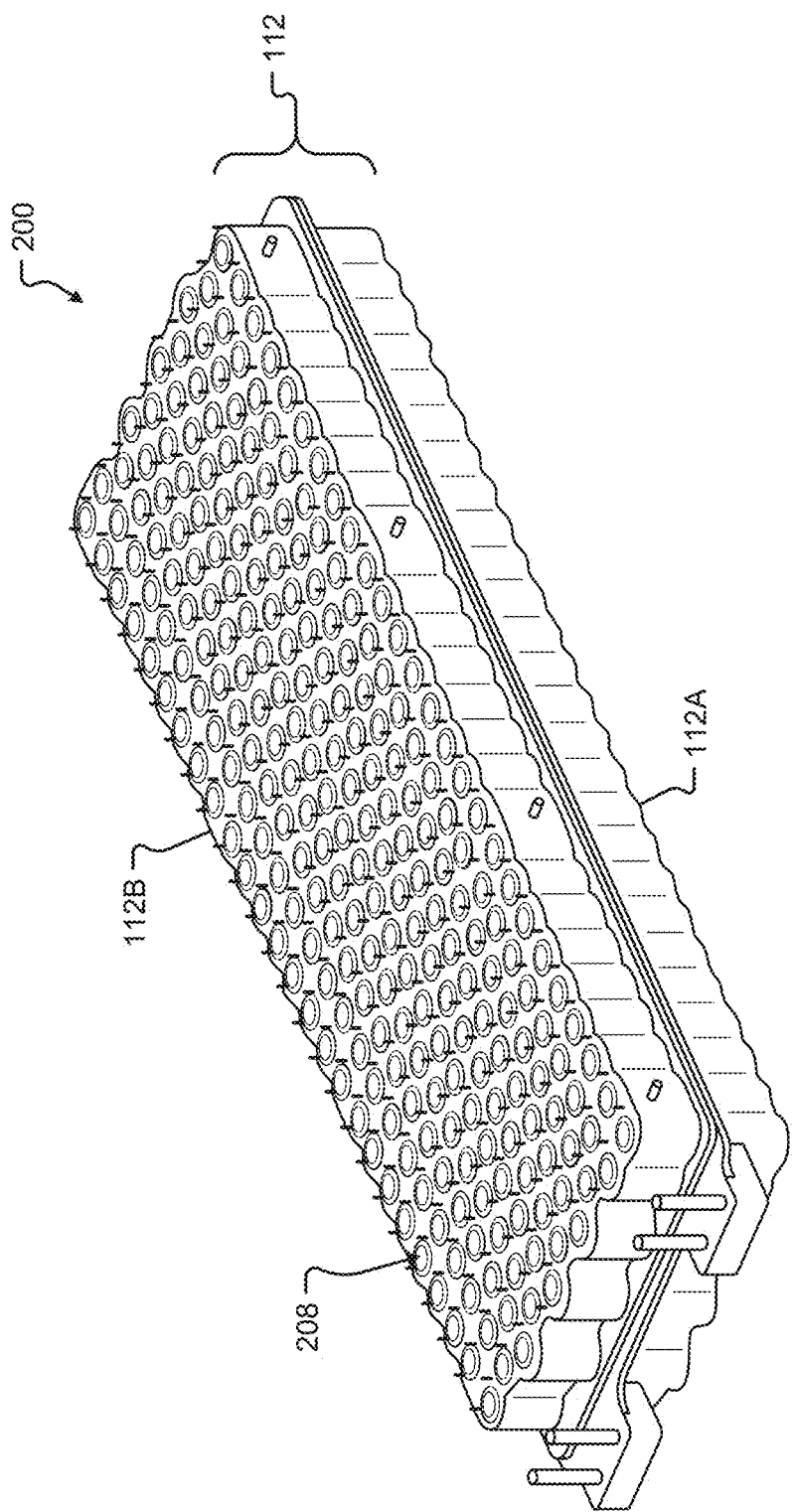
FIG. 2 shows a perspective view of the joined housing and cells forming the integrated battery cell structural support for the battery module in accordance with embodiments of the present disclosure.

FIG. 2 shows a perspective view of the joined housing and cells forming the integrated battery cell structural support 200 for the battery module 100 in accordance with embodiments of the present disclosure. The integrated battery cell structural support 200 may at least comprise a housing 112 comprising a lower housing 112A, the battery cells 208, an upper housing, or cover, 112B, and other structural components (not shown; described below) disposed above and/or between adjacent battery cells 208 as well as between the battery cells 208 and the lower housing 112A and/or cover 112B. As shown in FIG. 2, the lower housing 112A and/or the cover 112B may be configured to at least partially contain the battery cells 208. For instance, the lower housing 112A and the cover 112B may include a number of surfaces and walls defining battery cell 208 containment cavities including volumes for receiving the battery cells 208. Both the lower housing 112A and cover 112B may include a number of receptacles sized to receive and arrange each of the battery cells 208 relative to one another. In one embodiment, the lower housing 112A and cover 112B may include receptacles, or apertures, configured to receive one or more fasteners and mount sleeves. Thermally conductive, electrically insulating materials may be disposed within the housing 112 and between the cells 208, as described herein.

In various embodiments, as a structure surrounding the cells 208, an upper layer of a PCC material and a lower layer of a carrier filled with a lightweight material may be used. The carrier may be a structure that defines a space inside of which a material is inserted, and the carrier may use portions of the housing 112, portions of the PCC material, or portions of other components to define the space. In configurations of the carrier, a material such as a liquid foam may be configured to flow into at least portions of the spaces between spaced-apart adjacent battery cells 208 and other areas around the battery cells 208 inside of the housing 112 during assembly of the battery module 100. Once cured, or hardened, the material may form a structure surrounding portions of the battery cells 208. In some embodiments, the material may be a structural adhesive that adheres to and connects the battery cells 208, forming a unified structure in the battery module 108. Additionally or alternatively, the structural adhesive may adhere to other components of the battery module 108 (e.g., one or more mount sleeves, housing 112, a PCC material, etc.). The material may act as a structural adhesive, thermal conductor, and a dielectric barrier within the battery module 108.

Figure 3:
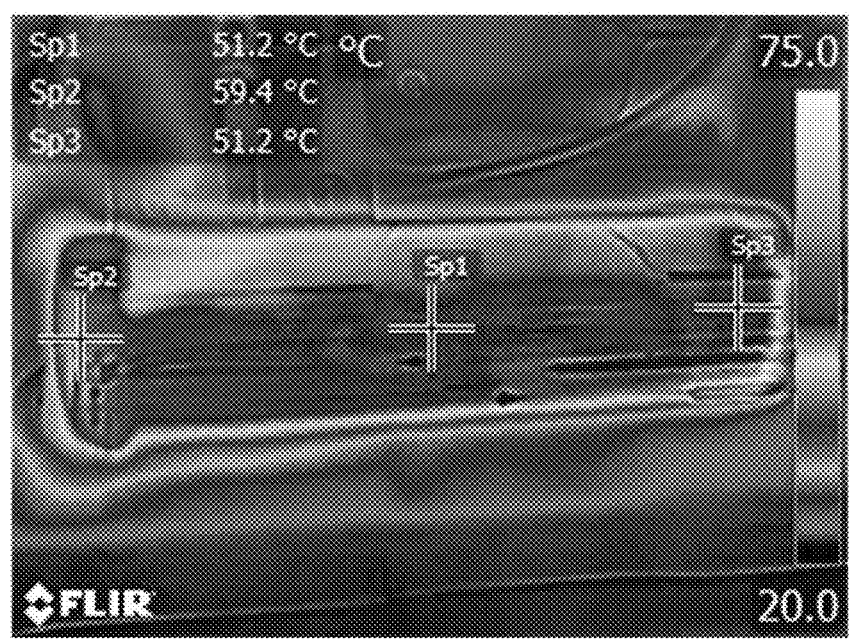
FIG. 3 shows a thermal image of a lithium-ion cell during fast charge.

FIG. 3 shows a thermal image of a lithium-ion cell during fast charge. The cell shown is a 21700 lithium-ion cell having sensors that measured the temperature of the cell during the fast charge. The sensors were located at positions at either end of the cell in a length or height direction (e.g., a top location and a bottom location) and at a middle of the cell. As shown in FIG. 3, Sp2 is located by the cell header (e.g., at a top side of the cell) and Sp3 is located at a bottom side (opposite the top side) of the cell, with Sp1 being located at a middle position of the cell; thus, the cell is in a horizontal position with the height of the cell (the length between the top side and the bottom side of the cell) extending in a substantially horizontal direction. On the right side of FIG. 3, a thermal scale is shown, conveying that a white color is at about 75.0 degrees Celsius (° C.), and a dark purple color is at about 20.0° C., with other colors in between.

During the fast charge, as shown in the infrared scan of FIG. 3, the top of the cell (near or at the header) is at a higher temperature than the middle and lower portions of the cell, displaying an uneven temperature distribution within the cell with excessive heat (e.g., a hot spot) at a top portion of the cell by or at the header of the cell. For example, Sp2 is at 59.4° C. while Sp1 and Sp3 are each at 51.2° C. This variance in temperature between a top portion of the cell and a bottom portion of the cell is problematic for various reasons. For example, it is problematic because excessive temperatures can cause damage to a cell. Also, it is problematic because it is an important feature for lithium-ion batteries to be able to fast charge. However, as explained herein, fast charging leads to excessive heat that is generated inside the top portion of the cell (in particular in relation to a lower portion of the cell), and this excessive heat leads to reduced battery life (including cycle and calendar life) due to cell damage. The inventor of the present disclosure have advantageously discovered methods and systems that advantageously address these problems of the uneven temperature distribution and excessive temperature resulting in cell damage, while improving the gravimetric energy density of battery modules, as described herein.

Figure 4:
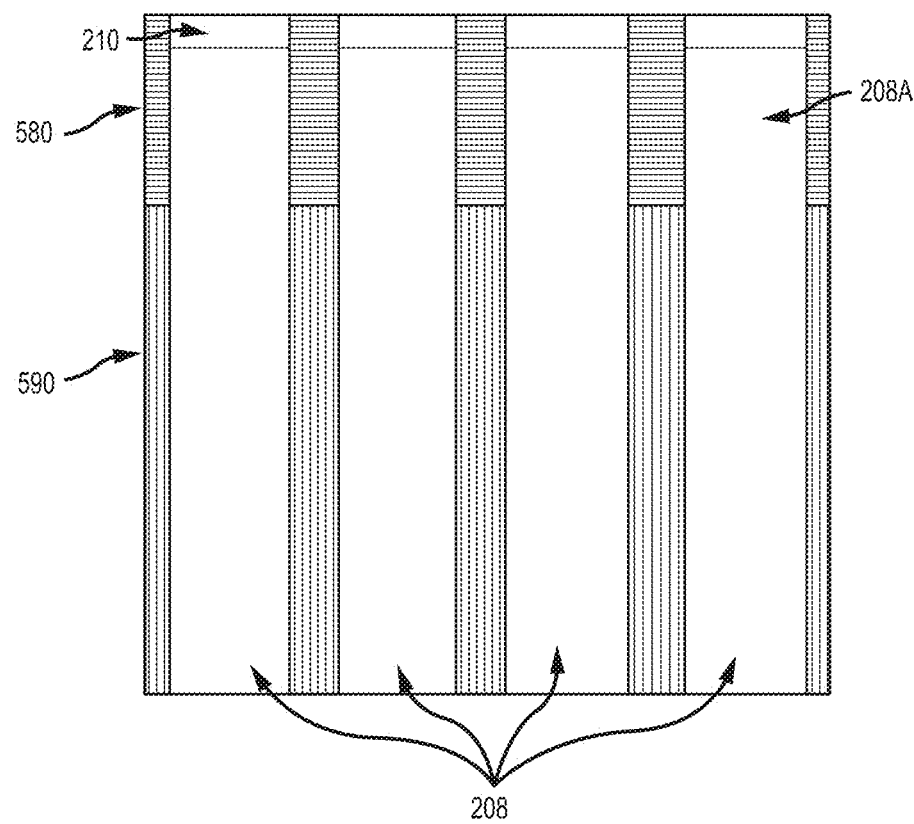
FIG. 4 shows a cross-sectional view of a cell structure in accordance with embodiments of the present disclosure.

FIG. 4 shows a cross-sectional view of a cell structure in accordance with embodiments of the present disclosure. In FIG. 4, the cells 208 are arranged within the structure so that they are adjacent to one another in a radial direction. The cells 208 are arranged so that a top portion of the cells 208A and their headers 210 are each positioned at a top portion of the structure. The structure within which the cells are positioned can be made up of, for example, two different materials, a PCC layer 580 and lightweight material layer 590. The structure (including the PCC layer 580 and lightweight material layer 590) may be any shape and size and have any arrangement of cells, including a honeycomb design/pattern or a matrix, for example. Thus, the structure, including the PCC layer 580 and the lightweight material layer 590, may be referred to herein as a honeycomb or matrix.

As shown in FIG. 4, the structure (e.g., PCC layer 580 and lightweight material layer 590) surrounding portions of the cells 208 is in contact with at least portions of side areas of the cells 208, including cell headers 208A. The PCC layer 580 surrounds top portion of the cells 208A, which may include cell headers 210. The lightweight material layer 590 surrounds lower portions of the cells. Advantageously, the PCC layer 580 can provide a higher thermal conductivity (as compared to the lightweight material layer 590) at the top portion of the cells 208A (e.g., where the PCC layer 580 is located) where the excessive heat is unevenly generated during charging, as shown for example in FIG. 3. The PCC layer 580 may also advantageously be an electrical insulator. The PCC layer 580 may be configured so that it is only in contact with the cell headers 210; it may have a depth or thickness that limited to correspond to a height of the cell headers 210, as described further below.

In embodiments of the present disclosure, the PCC layer 580 may be located at a top portion of the cells by the cell headers 210 and the tops of the cells 208 do not protrude beyond the PCC layer 580. Reasons for such a configuration include that cells headers may be welded to tabs and a clearance space for the welding is necessary although heat is primarily generated in the cell headers 210.

Thus, the PCC layer 580 can advantageously absorb a greater amount of thermal energy from the cells during fast charge (versus a lower mass material), and the use of a lower mass thermally conductive material surrounding the lower section of the lithium-ion cells (e.g., the lightweight material layer 590) advantageously reduces the weight of the structure surrounding the cells 208. As a result, the top portions of the cells 208A (e.g., the cell headers 210) are prevented from heating at a faster rate and/or to a higher temperature, than the lower portions of the cells where the lightweight material layer 590 is located. Also advantageously, by providing the PCC layer 580 at only a top portion of the cells 208 so that the lightweight material layer 590 is provided at a lower portion of the cells (instead of providing the PCC layer 580 at various positions along the height of the cells or continuously along one or more portions of a height (from the top to the bottom) of the cells 208), the overall weight of the module can advantageously be reduced, thereby increasing the gravimetric energy density of the module 100 while simultaneously providing desirable thermal benefits. Said another way, if PCC material(s) were used over a greater portion of the cells height (e.g., from a portion between the top side and the bottom side, or extending a greater amount of the length of the cells than disclosed herein), then the added mass would problematically reduce the battery module's gravimetric energy density without providing corresponding thermal benefits. In various embodiments, the PCC material(s) may also advantageously provide electrical insulation between the cells 208A in addition to providing desirable thermal benefits.

The PCC layer 580 can be any number, type, or combination of phase change composite materials, and the PCM within the PCC layer 580 may be any number, type, or combination of phase change materials. Additionally, although the present disclosure uses the term "PCC layer," the PCC layer may be only one or more PCMs. PCMs disclosed herein may be free flowing and may be contained or bound, partially or fully, by heat spreaders, for example. Alternatively, the PCMs may be physically adsorbed into a carrying matrix. For example, the PCM may be absorbed and carried in a compressed expanded graphite mat or carbon foam that is a PCC material.

The melting temperature range of the PCM may be equal to or about equal to a recommended operating temperature or temperature range for the cells. Thus, the PCM may be chosen based on a predetermined temperature. Illustrative melting points of materials of the PCC layers include typically from about 32° C. to about 38° C., typically from about 45° C. to about 50° C., typically from about 48° C. to about 57° C., typically from about 45° C. to about 65° C., more typically about 37° C., more typically about 48° C., and more typically about 55° C.

Examples of materials used for the PCM include but are not limited to paraffin waxes (e.g., alkanes), fatty acids, polyethylene glycols, and sugar alcohols, among others. Examples of PCC frameworks for the PCM include but are not limited to porous ceramic/graphite foams (ceramic can be $Al_2O_3$), ceramic/graphene foams, metal-organic frameworks (MOF), silicon oxides, and calcium silicates, among others. As will be appreciated by those of skill in the art, other materials may be employed for the PCM or PCC framework depending on the application.

The lightweight material layer 590 can be any type of material that has a lower mass than the PCC layer 580 used in the module, or a lower mass than the PCM used in the module. Examples of materials used for the lightweight material layer 590 include but are not limited to foams, plastics, other lightweight dielectric materials (e.g., low-density rigid foam, closed-cell foam, open-cell foam, molded plastic, composites, etc.), including aerogels, open cell polyurethane, reticulated polyurethane, open cell polyester, open cell polyamide, and open cell polyether, among others. The lightweight material layer 590 may act as a structural adhesive, thermal conductor, and a dielectric barrier within the battery module 100.

Thus, as shown by way of example in FIG. 4, embodiments of the present disclosure advantageously provide for battery modules having a PCC layer together with a lightweight material layer to reduce the module weight while at the same time permitting thermal transfer between cells to lower cell temperatures and decrease uneven temperature distribution (including any hot spots) within the cells.

Figure 5:
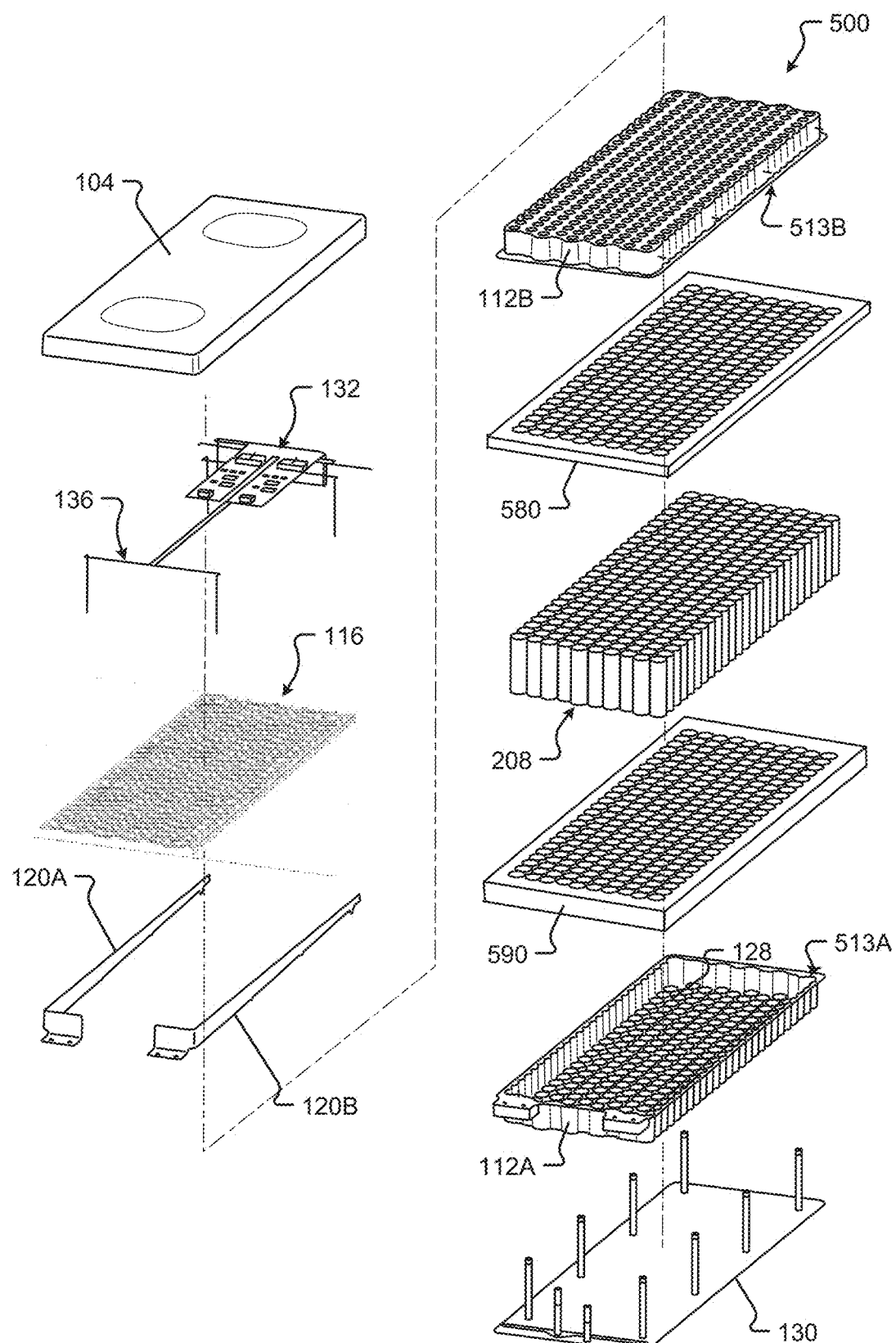
FIG. 5 shows a perspective exploded view of the battery module of FIG. 1 in accordance with embodiments of the present disclosure.

FIG. 5 shows an embodiment of a perspective exploded view 500 of the battery module 100 of FIG. 1. The battery module may comprise an upper shield 104, a plurality of battery cells 208, a housing 112 configured to contain the battery cells 208, battery cell interconnects 116, first and second battery module busbars 120A, 120B, a cooling plate 130, and one or more mount sleeves 128. In some embodiments, the battery module may include a battery management system 132 and sensing system 136.

In the exploded view 500 of the battery module 100 shown in FIG. 5, the upper shield 204 is configured to substantially cover the battery cell interconnects 116, battery cells 208, and other electrical connections (e.g., first and second battery module busbars 120A, 120B, etc.). In some embodiments, the upper shield 204 may correspond to a drip shield. In any event, the upper shield 204 may be made from molded, formed, or otherwise shaped plastic, dielectric, or nonconductive material. In one embodiment, the battery management system (BMS) 132 electronics (e.g., printed circuit board, chips, etc.) may be mounted to an exterior or interior surface of the upper shield 104. As shown in FIG. 5, the BMS 132 and corresponding electronics are mounted to an exterior surface (e.g., a surface separate and spaced apart from the battery cells 208 and battery cell interconnects 116, etc.). The first and second battery module busbars 220A, 220B may extend from a high voltage connection end, including two connection standoffs per busbar 220A, 220B, along the length of the battery module 100 to the opposite end of the battery module 100.

The lower housing 112A and the cover 112B can include a number of surfaces and walls defining containment cavities for the battery cells 208 including volumes for receiving the battery cells 208. Both the lower housing 112A and cover 112B may include a number of receptacles sized to receive and arrange each of the battery cells 208 relative to one another. The lower housing 112A and the cover 112B further includes a volume to receive the PCC layer 580 and the lightweight material layer 590. In one embodiment, the lower housing 112A and cover 112B may include receptacles, or apertures, configured to receive one or more fasteners and mount sleeves 128.

The PCC layer 580 may be disposed at, or adjacent to, an upper portion of the battery cells 208 (e.g., adjacent to headers of the cells 208). Thus, the PCC layer 580 may be adjacent to, or in contact with, the cover 112B. In various embodiments, an entire upper surface of the PCC layer 580 may be in contact with an interior surface of the cover 112B, or an entire upper surface and also side surfaces of the PCC layer 580 may be in contact with interior surfaces of the cover 112B.

In some embodiments, a structure surrounding the cells 208 (e.g., in contact with portions of sides of the cells 208) includes the PCC layer 580 and the lightweight material layer 590. The structure (e.g., including the PCC layer 580 and lightweight material layer 590) may be any shape and size and have any arrangement of receptacles (also referred to as openings and/or through holes herein) for receiving the cells 208. The arrangement of the receptacles may be in a honeycomb design/pattern or a matrix, for example. Thus, the structure may be referred to herein as a honeycomb or matrix. In embodiments of the present disclosure, after receiving the cells 208, the PCC layer 580 is located adjacent to headers of the cells. In various embodiments, the PCC layer 590 may be in direct contact with an entirety of side surface areas of the headers of the cells. The PCC layer 580 may thereby advantageously improve the thermal conduction of the headers of the cells.

The lightweight material layer 590 is positioned adjacent to the PCC layer 580 and is located at a lower portion of the cells 208. The lightweight material layer 590 may be disposed at, or adjacent to, a lower or bottom portion of the battery cells 208 (e.g., underneath the PCC layer 580). Thus, the lightweight material layer 590 may be adjacent to, or in contact with, the lower housing 112A. The lightweight material layer 590 may be in direct contact with an entirety of side surface areas of the cells that are not in contact with the PCC layer 580. In various embodiments, an entire lower surface of the lightweight material layer 590 may be in contact with an interior surface of the lower housing 112A, or an entire lower surface and also side surfaces of the lightweight material layer 590 may be in contact with interior surfaces of the lower housing 112A.

The PCC layer 580 and the lightweight material layer 590 may have any size; thus, dimensions of each of the PCC layer 580 and the lightweight material layer 590 do not need to correspond to dimensions of the housing 112, the lower housing 112A, or the cover 112B. For example, side surfaces of the lightweight material layer 590 may be in contact with interior surfaces of the lower housing 112A as well as be in contact with interior surfaces of the cover 112B.

The PCC layer 580 and the lightweight material layer 590 may each separately be placed on the cells 208, or alternatively the PCC layer 580 and the lightweight material layer 590 may be stacked on top of one another prior to placing the cells 208 within the structure. Methods of manufacturing and assembling the PCC layer 580 and the lightweight material layer 590 include any type of method and are not limited to the descriptions herein.

Each of the PCC layer 580 and the lightweight material layer 590 may be configured, for example, as a pre-formed structure, e.g., a die cut or formed block of material that has the receptacles to receive the cells 208 formed therein. A pre-formed or premade structure may be manufactured by a process that is separate from other processes of manufacturing the battery module. If either or both of the PCC layer 580 and the lightweight material layer 590 are a premade framework (including a formed block or die cut block), such a configuration could advantageously decrease a module assembly time as well as provide other advantages, including ease of assembly and reduced costs.

Alternatively, one or both of the PCC layer 580 and the lightweight material layer 590 may be formed within a carrier. In various embodiments described herein, it is the lightweight material layer 590 that is formed within a carrier. The carrier inside of which the lightweight material layer 590, for example, may be formed, may include containment cavities including volumes for receiving the battery cells 208. The housing 112 may function as a portion or all of a carrier inside of which materials of the lightweight material layer 590 may be formed, as described further below.

In various embodiments, the PCC layer 580 is a formed block of material and the lightweight material layer 590 is an injected material. If the lightweight material layer 590 is injected, then the lightweight material layer 590 may be injected at any timing, e.g., after the PCC layer 580 and cells 208 are in place within the housing 112 and/or carrier of the lightweight material layer 590, or after the cells 208 are in place within the housing 112 (or the lower housing 112A) but prior to positioning of the PCC layer 580, for example. In certain aspects, a foam or structural adhesive composition of the lightweight material layer 590 is injected into a carrier that may have the dimensions of the lightweight material layer 590 shown in FIG. 5. The lightweight material layer 590 is a liquid injected (e.g., as a foam or structural adhesive) into the carrier so that the lightweight material layer 590 is configured as a same shape as the carrier (e.g., the shape of the lightweight material layer 590 element shown in FIG. 5) upon solidifying. The carrier containing the lightweight material layer may be configured to act as a gasket (e.g., preventing the foam or structural adhesive from expanding outside of an area of the carrier as the foam or structural adhesive cures in the carrier). Further, the arrangement of the PCC layer 580 can provide a seal, or gasket, between the injected composition of the lightweight material layer 590 and the battery cell electrical interconnections 216, preventing uncured and/or cured portions of the lightweight material layer 590 from reaching these sensitive electrical areas.

For purposes of example, if the carrier is a shape of the lightweight material layer 590, although shown in FIG. 5 as an element surrounding the battery cells 208, it should be appreciated that the carrier may have void spaces between the cells 208 so that the composition of the lightweight material layer 590 may be inserted into the spaces surrounding the battery cells 208 while the cells 208 are inside the carrier in an assembled, or connected, state. Thus, the lightweight material layer 590 may be inserted or deposited into these spaces while in a fluid, or semi-fluid state, and when cured, the lightweight material layer 590 may be in direct contact with surfaces of the cells 208 (e.g., portions of side surfaces of the cells 208), and mechanically connect the elements that are in contact with the lightweight material layer 590 (e.g., the battery cells 208, the carrier, the lower housing 112A, the cover 112B, and the PCC layer 580, among others).

In some embodiments, the lower housing 112A and the cover 112B may be attached together, at least temporarily, via a flanged connection 513A, 513B. For instance, the lower housing 112A may include a flange, or flanged surface, 513A that mates with a mating flanged surface of the cover 112B (e.g., via an adhesive, fastener, connection, tab-and-slot, clip, or other connective interface, etc.). The flanged surface 513A may follow at least a portion of the periphery of the lower housing 112A. The flanged surface 513A may be offset from and substantially parallel to a base, or planar surface, of the lower housing 112A. In one embodiment, the flanged surface 513A may extend outwardly from the walls of the lower housing 112A. The cover 112B may include a similar mating flange, or mating flanged surface, 513B that follows at least a portion of the periphery of the cover 112B and/or the lower housing 112A. The mating flanged surface 513B of the cover 112B may be offset from and substantially parallel to a planar surface, of the cover 112B. In one embodiment, the mating flanged surface 513B may extend outwardly from the walls of the cover 112B.

The flanged surface 513A and/or the mating flanged surface 513B may include an adhesive layer (not shown) deposited thereon. The adhesive layer may attach the lower housing 112A to the cover 112B, and more specifically, connect the flanged surface 513A to the mating flanged surface 513B. In one embodiment, the flanged surface 513A and/or the mating flanged surface 513B may include at least one connecting element (not shown) that is configured to mate, or interconnect, with a corresponding feature on the other of the flanged surface 513A and/or the mating flanged surface 513B.

Figure 6:
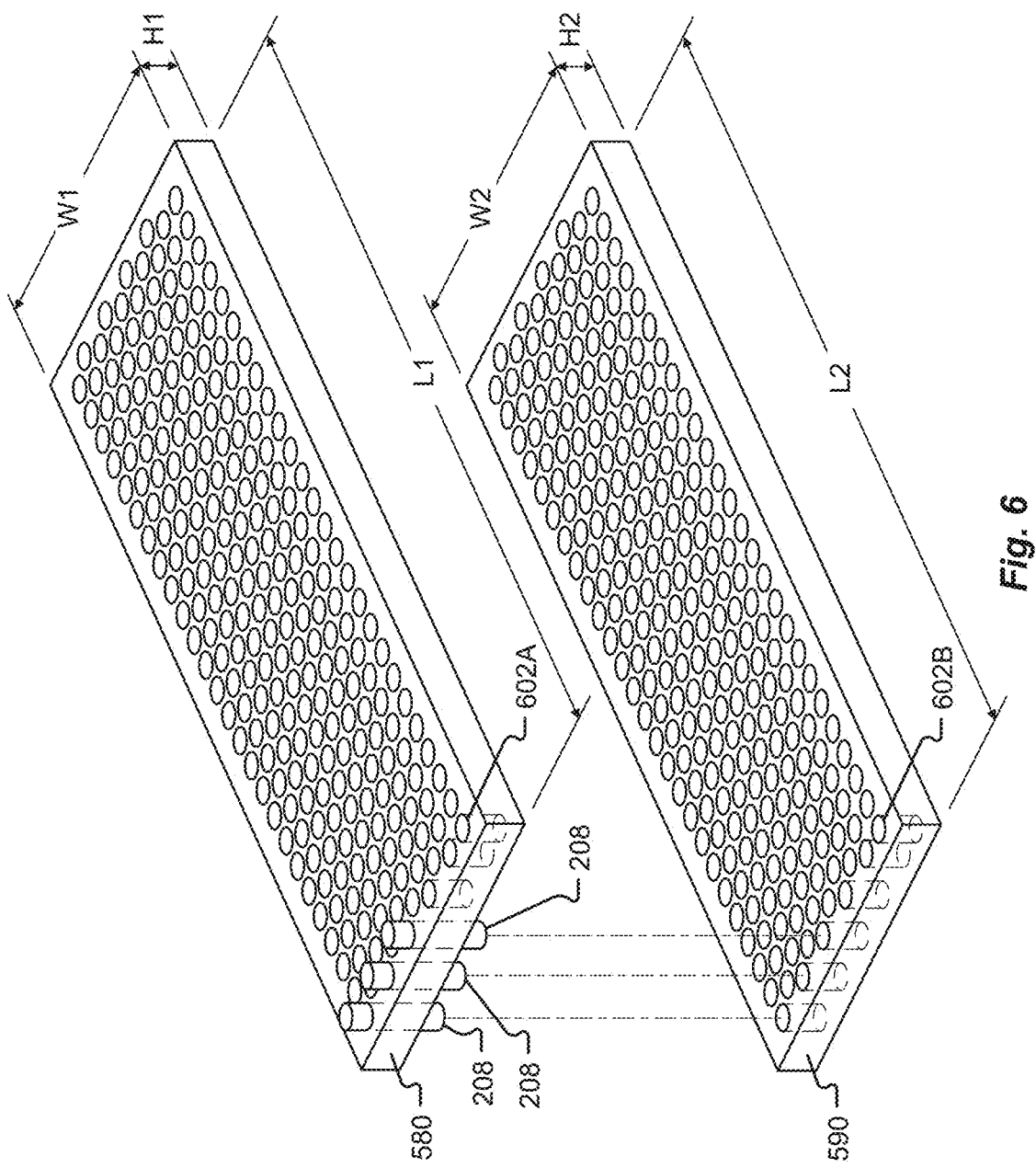
FIG. 6 shows a perspective exploded view of a battery cell structure in accordance with embodiments of the present disclosure.

FIG. 6 shows a perspective view of a battery cell retaining form in accordance with embodiments of the present disclosure, which includes, by way of example, a PCC layer 580 and a lightweight material layer 590. The PCC layer 580 and lightweight material layer 590 each have receptacles 602A for several battery cells 208 disposed therein in accordance with embodiments of the present disclosure. In some embodiments, the PCC layer 580 and lightweight material layer 590 may each comprise a substantially planar first surface offset a height (e.g., H1 for PCC layer 580 and H2 for lightweight material layer 590) from a substantially planar second surface. The PCC layer 580 and lightweight material layer 590 may each include a number of sides, or sidewalls, disposed around a periphery of each of the PCC layer 580 and the lightweight material layer 590. Although each of the PCC layer 580 and lightweight material layer 590 are shown as a substantially rectangular solid material, it should be appreciated that they may each be of any solid shape substantially conforming to an arrangement of the battery cells 208 in the housing 112 of the battery module 100.

The height of the PCC layer 580 may be set based on any criteria. For example, the height of the PCC layer 580 may be based on any one or more criteria, including but not limited to a function of thermal properties of the structure materials, a function of a header dimension of the cells 208, a function of an operating temperature of the cells 208, and a function of the desired gravimetric energy density of the module 100, among others. For example, a height of the PCC layer 580 may be determined based on a desired temperature difference between the header of the cell and a lower location on the cell. Such a desired temperature difference may be typically within about 3° C., more typically within about 2° C., and more typically within about 1° C. or less.

In various embodiments, H1 (e.g., the height of the PCC layer 580) is typically about 40% to about 5% of H2 (e.g., the height of the lightweight material layer 590), more typically about 30% to about 10% of H2, more typically about 25% to about 15% of H2, and more typically about 20% to about 18% of H2.

In various embodiments, H1 is typically less than about 50% of the total height ("HT") (H1+H2), more typically from about 45% to about 5% of HT, more typically from about 40% to about 10% of HT, and more typically from about 35% to about 15% of HT, while H2 is typically greater than about 50% of HT, more typically from about 55% to about 95% of HT, more typically from about 60% to about 90% of HT, and more typically from about 65% to about 85% of HT.

The density of the PCC layer 580 is greater than the density of the lightweight material layer 590. In various embodiments, the density of the PCC layer 580 ranges typically from about 500 g/L to about 1500 g/L and more typically from about 800 g/L to about 1100 g/L. In further embodiments, the density of the PCC layer 580 can range typically from about 600 g/L to about 1400 g/L, more typically from about 700 g/L to about 1300 g/L, and more typically from about 700 g/L to about 1200 g/L. The density of the lightweight material layer 590 ranges typically from about 100 g/L to about 500 g/L and more typically from about 200 g/L to about 400 g/L. In additional embodiments, the density of the lightweight material layer 590 can range typically from about 120 g/L to about 480 g/L, more typically from about 140 g/L to about 460 g/L, more typically from about 160 g/L to about 440 g/L, and more typically from about 180 g/L to about 420 g/L.

The density of the combined PCC layer 580 and lightweight material layer 590 ("the combined layer") is less than the density of the PCC layer but more than the density of the lightweight material layer. The density of the combined PCC layer 580 and lightweight material layer 590 ("the combined layer") may be any density that is less than the density of the PCC layer and more than the density of the lightweight material layer. In various embodiments, the density of the combined PCC layer 580/lightweight material layer 590 ranges typically from about 22% to about 92% of the density of the PCC layer and more typically from about 26% to about 43% of the density of the PCC layer and typically from about 122% to about 502% of the density of the lightweight layer and more typically from about 145% to about 234% of the density of the lightweight layer.

In embodiments of the present disclosure, the array of receptacles 602A may be arranged, or formed, in each of the PCC layer 580 and lightweight material layer 590 in a battery cell distribution pattern. The battery cell distribution pattern may be the same or different in each of the PCC layer 580 and lightweight material layer 590. For example, receptacles in the PCC layer 580 do not need to have a same radius as the corresponding receptacles in the lightweight material layer 590. The PCC layer 580, the lightweight material layer 590, and the cells 208 may be positioned by any method so that the cells extend through each of the respective receptacles in the PCC layer 580 and lightweight material layer 590. Illustrative cell placements are shown by the dotted lines extending from cells 208 to respective receptacles in lightweight material layer 590 in FIG. 6.

The receptacles 604 may be die cut, wire electrical discharge machined (EDM) cut, machined, molded, or otherwise formed through any layers of the structure. In various aspects of the present disclosure, the number of receptacles 604, or battery receiving features, in the structure (e.g., each of PCM layer 580 and lightweight material layer 590) match the number of battery cells 208 in the battery module 108.

Figure 7A:
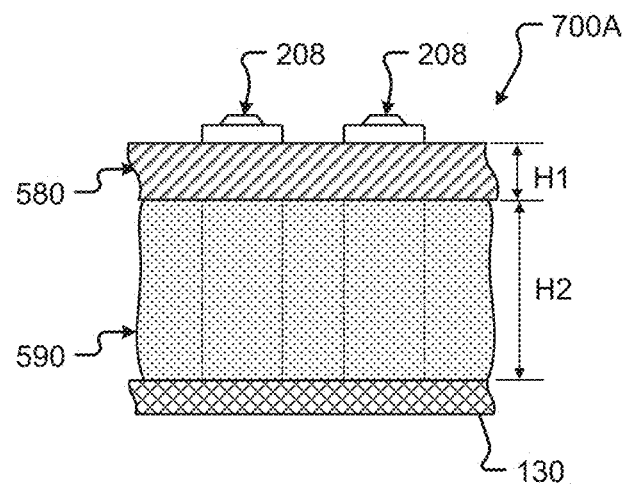
FIG. 7A shows a cross-sectional view of a battery cell structure in accordance with embodiments of the present disclosure.
Figure 7B:
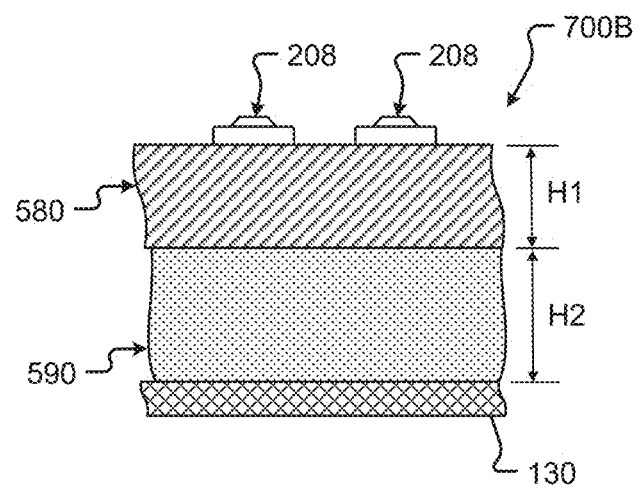
FIG. 7B shows a cross-sectional view of a battery cell structure in accordance with embodiments of the present disclosure.

Referring now to FIGS. 7A-7B, cross-sectional views of structures of the module 100 are shown in accordance with embodiments of the present disclosure. In FIGS. 7A-7B, battery cells 208 held within receptacles of the PCC layer 580 and lightweight material layer 590 disposed inside a battery module 100 is shown. In particular, in each of FIGS. 7A and 7B, the battery cells 208 are shown held in place, at least partially, via the PCC layer 580 and lightweight material layer 590.

In FIG. 7A, a first cross-sectional view 700A of cells 208 is shown, including PCC layer 580, lightweight material layer 590, and cooling plate 130. As shown in FIG. 7A, H1 corresponds to a height (also referred to herein as depth) of the PCC layer 580 in an illustrative first cross-sectional view 700A. H1 may be a dimension that corresponds to a dimension of the header of the cells. Thus, the PCC layer 580 corresponding to H1 may be in direct contact with an entirety of side surfaces of the headers of the cells and not extend beyond the header of the cells 208. The lightweight material layer 590 may be in contact with an entirety of side surfaces of the cells 208 that are underneath the PCC layer 580 and not in contact with the PCC layer 580. As shown, the lightweight material layer 590 may be directly adjacent to, and in contact with, the PCC layer 580.

In FIG. 7B, a second cross-sectional view 700B of cells 208 is shown, including PCC layer 580, lightweight material layer 590, and cooling plate 130. As shown in FIG. 7B, H1 corresponds to a height (also referred to herein as depth) of the PCC layer 580 in an illustrative second cross-sectional view 700B. As shown in FIG. 7B, the PCC layer 580 corresponding to H1 may extend to cover side surfaces of the cells other than a header side surface of the cells. Thus, the PCC layer 580 corresponding to H1 may be in direct contact with an entirety of side surfaces of the headers of the cells in addition to portions of the side surfaces of the cells that are not the cell headers. The lightweight material layer 590 may be in contact with an entirety of side surfaces of the cells 208 that are underneath the PCC layer 580 and not in contact with the PCC layer 580. As shown, the lightweight material layer 590 may be directly adjacent to, and in contact with, the PCC layer 580.

Figure 7C:
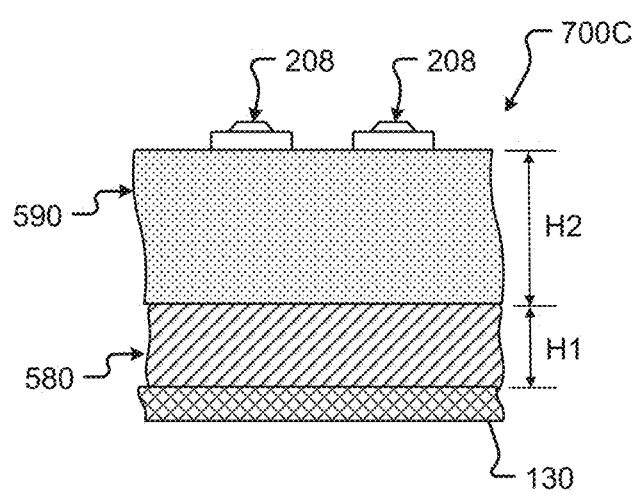
FIG. 7C shows a cross-sectional view of a battery cell structure in accordance with embodiments of the present disclosure.

In FIG. 7C, a third cross-sectional view 700C of cells 208 is shown, including PCC layer 580, lightweight material layer 590, and cooling plate 130. As shown in FIG. 7C, H1 corresponds to a height (also referred to herein as depth) of the PCC layer 580 in an illustrative second cross-sectional view 700C. As shown in FIG. 7B, the PCC layer 580 corresponding to H1 may be located at a bottom portion of the cells 208, closest to, or adjacent to, the cooling plate 130, and the lightweight material layer 590 may be located at an upper portion of the cells 208. The lightweight material layer 590 may extend to cover side surfaces of the cells other than a header side surface of the cells. Thus, the lightweight material layer 590, corresponding to H2 may be in direct contact with an entirety of side surfaces of the headers of the cells in addition to portions of the side surfaces of the cells that are not the cell headers. Also, the PCC layer 580 may be in contact with an entirety of side surfaces of the cells 208 that are underneath the lightweight material layer 590 and not in contact with the lightweight material layer 590. As shown, the PCC layer 580 may be directly adjacent to, and in contact with, the lightweight material layer 590.

The dimensions of the PCC layer 580 and the lightweight material layer 590 may vary and may be any dimensions that are advantageous as described herein. Also, the dimensions of the PCC layer 580 and the lightweight material layer 590 may vary depending on other variables within the system, e.g., depending on types of cells used within the module, such as a 18650 (65 mm long) cell or 21700 (70 mm long) cell, among others. For example, in some embodiments, in FIGS. 7A-7C, H1 may be typically less than about 50% of the total height ("HT") (H1+H2), more typically from about 45% to about 5% of HT, more typically from about 40% to about 10% of HT, and more typically from about 35% to about 15% of HT, while H2 is typically greater than about 50% of HT, more typically from about 55% to about 95% of HT, more typically from about 60% to about 90% of HT, and more typically from about 65% to about 85% of HT. In additional embodiments, H1 may be typically from about 22% to about 92% of H2, and more typically from about 26% to about 43% of H2. Also, H2 may be typically from about 122% to about 502% of H1, and more typically from about 145% to about 234% of H1.

Figure 8A:
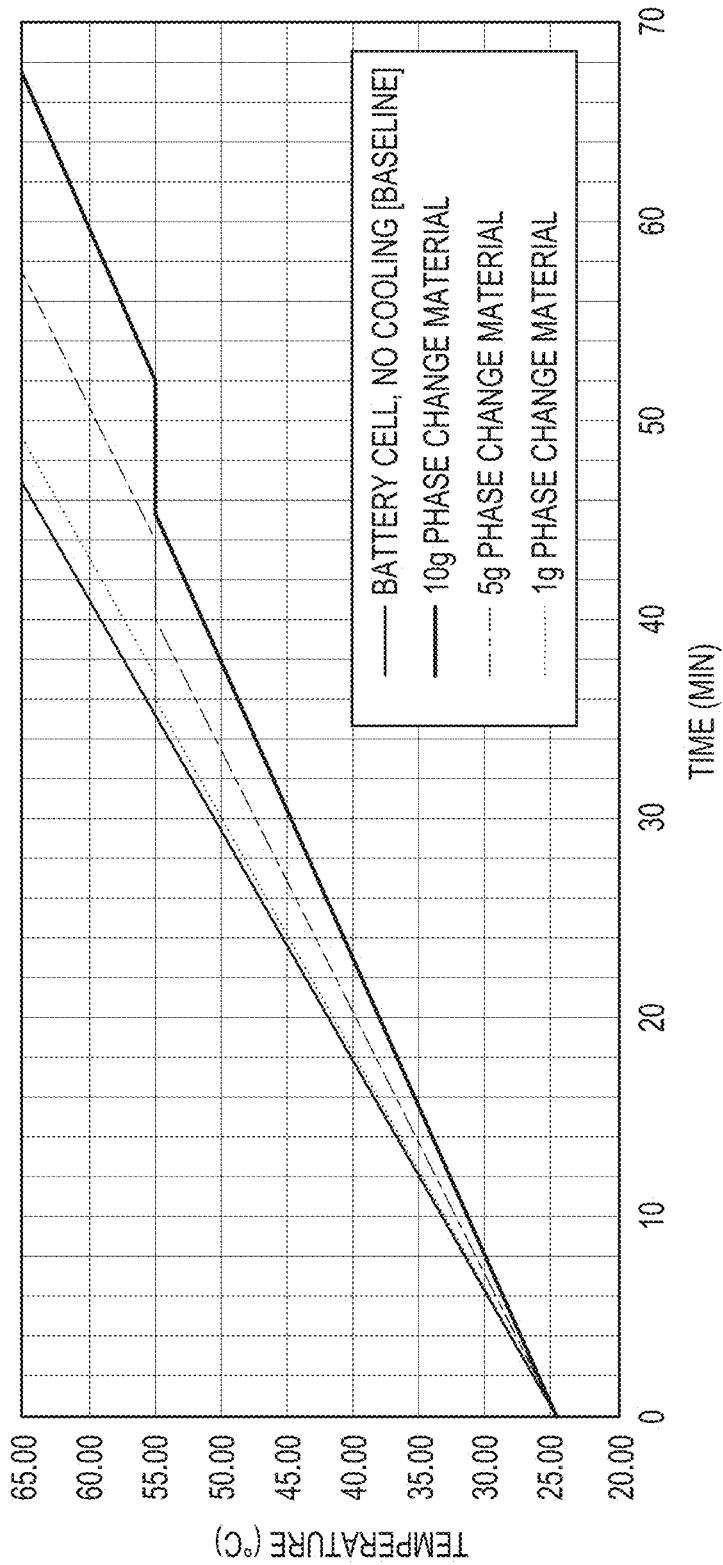
FIG. 8A shows a thermal model at a 1 C charge in accordance with embodiments of the present disclosure.
Figure 8B:
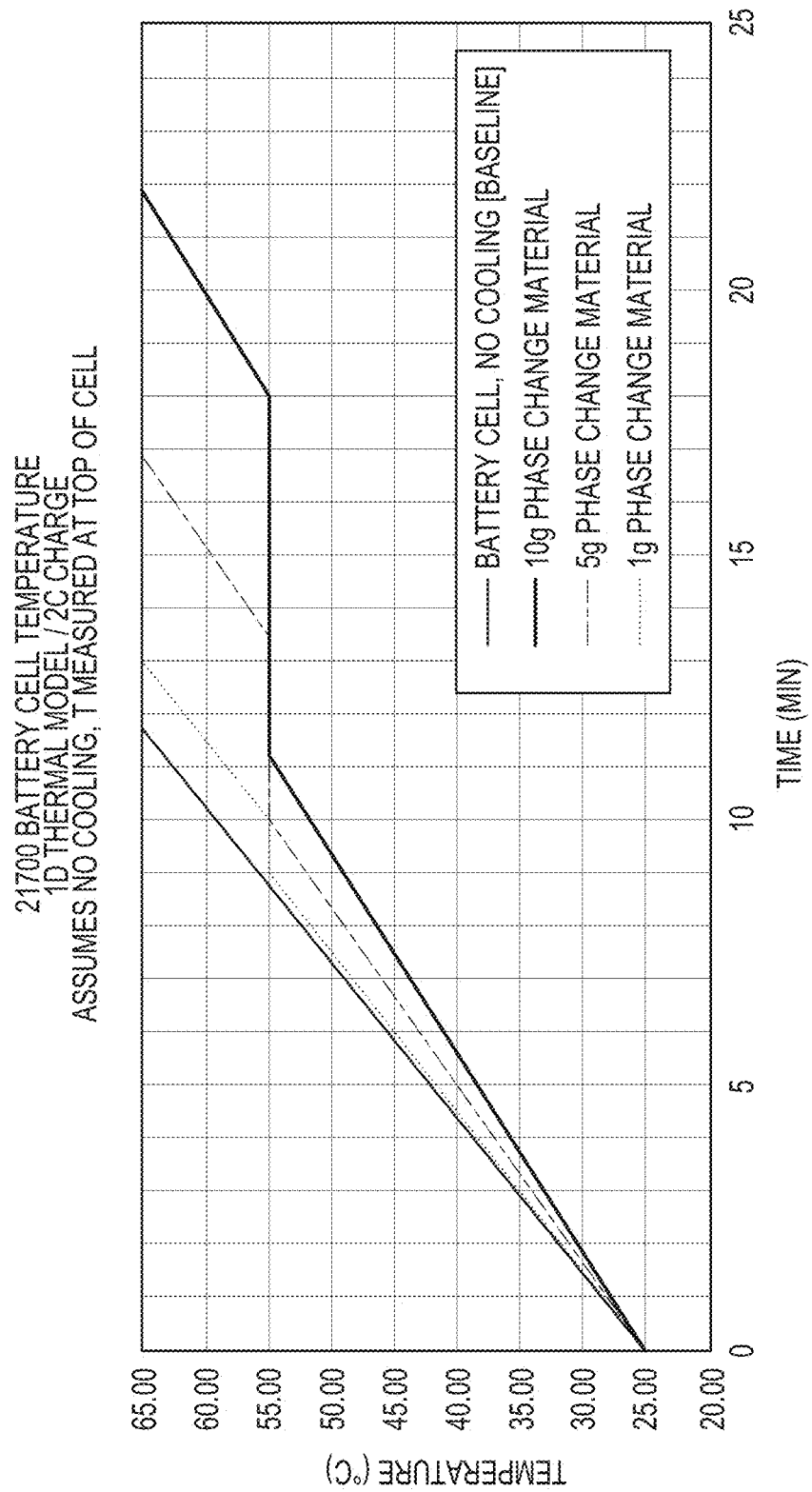
FIG. 8B shows a thermal model at a 2 C charge in accordance with embodiments of the present disclosure.
Figure 8C:
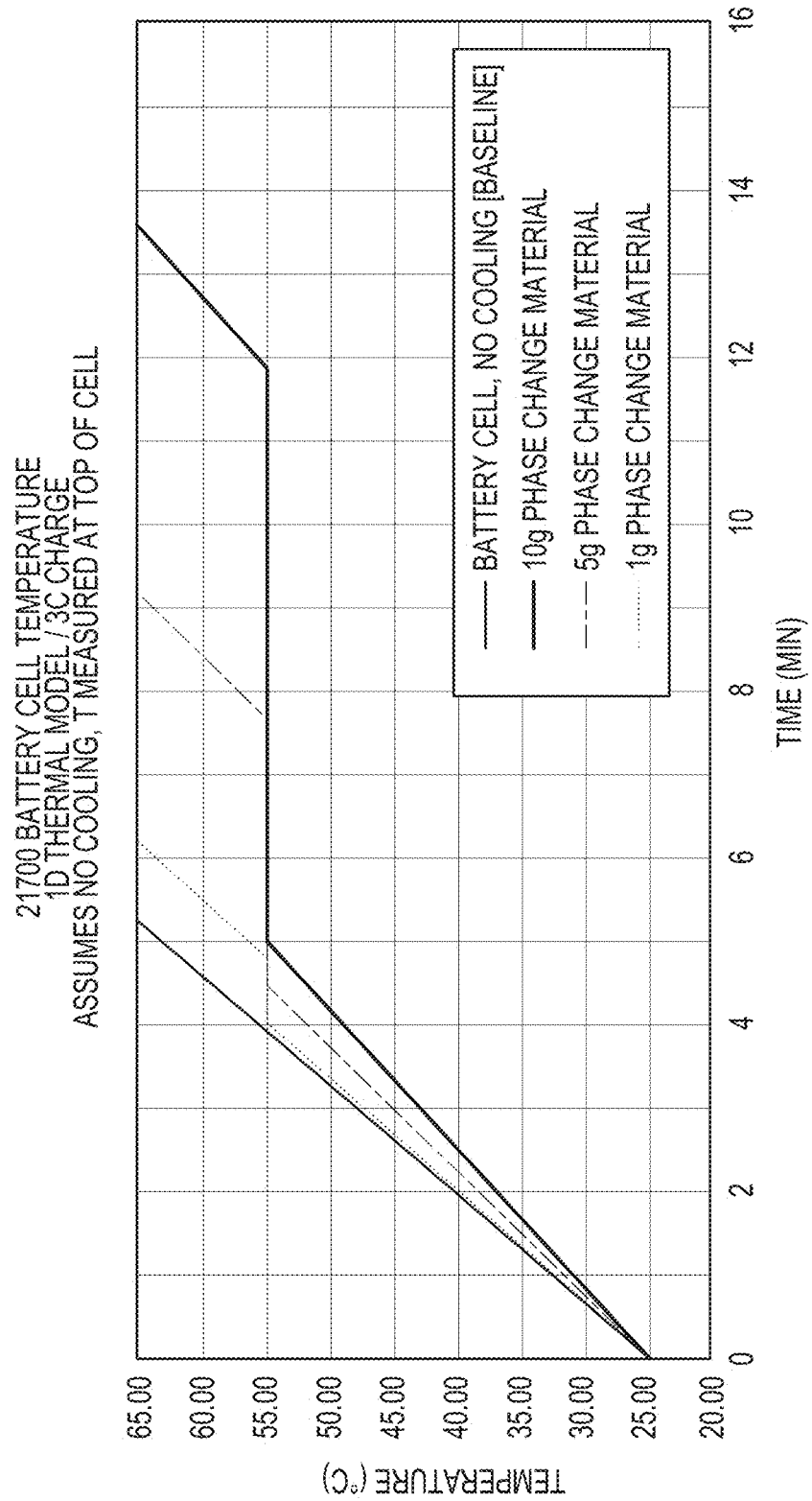
FIG. 8C shows a thermal model at a 3 C charge in accordance with embodiments of the present disclosure.

FIGS. 8A-C show thermal models of a cell at 1 C, 2 C, and 3 C charge rates in accordance with embodiments of the present disclosure. Charge and discharge rates of batteries are governed by C-rates. For example, the capacity of a battery may be commonly rated at 1 C, meaning that a fully charged battery rated at 1 Ah should provide 1 A for one hour. The same battery discharging at 0.5 C should provide 500 mA for two hours, and at 2 C it delivers 2 A for 30 minutes. A C-rate of 1 C may also be known as a one-hour discharge, 0.5 C or C/2 may be known as a two-hour discharge, and 0.2 C or C/5 may be known as a 5-hour discharge. The respective charge rates are similarly proportional. In various embodiments, the charge rates of 2 C and 3 C are considered fast charge rates.

In particular, a 4.8 Ah 21700 lithium-ion cylindrical cell surrounded by a phase change material was charged at each rate while a temperature of the cell was monitored. The charging was performed while the temperature increased from about 25° C. to about 65° C. so that the charge was terminated when the temperature reached a maximum temperature of 65° C. This was repeated using four different compositions of the phase change material with no cooling of the cell during the charging. Time versus temperature data was thereby generated for the cell.

The four different compositions of the phase change material each included different amounts of PCC55-1000 within the matrix surrounding the cells (e.g., the PCC material surrounding the cells). Each of FIGS. 8A-C show data for each of the following: baseline with no PCC55-1000 used in the phase change material surrounding the cell; 1 gram (g) of PCC55-1000 used in the phase change material surrounding the cell; 5 g of PCC55-1000 used in the phase change material surrounding the cell; and 10 g of PCC55-1000 used in the phase change material surrounding the cell.

As shown in FIG. 8A, at a 1 C charge rate the baseline phase change material (having no PCC55-1000) resulted in a linear relationship of an increase in temperature of about 25° C. to about 65° C. during a time of about 47 minutes. The phase change material having 1 g of PCC55-1000 during the same increase in temperature resulted in a leveling out of the temperature at about 55° C. (e.g., the melting point of the PCC55-1000 material) for about 1 minute until the temperature rose again to be about 65° C. at about 49 minutes; thereby extending the charge time by about 2 minutes as compared to the baseline results. The phase change material having 5 g of the PCC55-1000 during the same increase in temperature resulted in a leveling out of the temperature at about 55° C. for about 4 minutes until the temperature rose again to be about 65° C. at about 57 minutes; thereby extending the charge time by about 10 minutes as compared to the baseline results. Also, the phase change material having 10 g of the PCC55-1000 during the same increase in temperature resulted in a leveling out of the temperature at about 55° C. for about 7 minutes until the temperature rose again to be about 65° C. at about 67 minutes; thereby extending the charge time by about 20 minutes as compared to the baseline results.

In FIG. 8B, at a 2 C charge rate the baseline phase change material (having no PCC55-1000) resulted in a linear relationship of an increase in temperature of about 25° C. to about 65° C. during a time of about 11.5 minutes. The phase change material having 1 g of PCC55-1000 during the same increase in temperature resulted in a leveling out of the temperature at about 55° C. for about 1 minute until the temperature rose again to be about 65° C. at about 13 minutes; thereby extending the charge time by about 1.5 minutes as compared to the baseline results. The phase change material having 5 g of the PCC55-1000 during the same increase in temperature resulted in a leveling out of the temperature at about 55° C. for about 3.5 minutes until the temperature rose again to be about 65° C. at about 17 minutes; thereby extending the charge time by about 5.5 minutes as compared to the baseline results. Also, the phase change material having 10 g of the PCC55-1000 during the same increase in temperature resulted in a leveling out of the temperature at about 55° C. for about 7 minutes until the temperature rose again to be about 65° C. at about 21.5 minutes; thereby extending the charge time by about 10 minutes as compared to the baseline results.

In FIG. 8C, at a 3 C charge rate the baseline phase change material (having no PCC55-1000) resulted in a linear relationship of an increase in temperature of about 25° C. to about 65° C. during a time of about 5.25 minutes. The phase change material having 1 g of PCC55-1000 during the same increase in temperature resulted in a leveling out of the temperature at about 55° C. for about 1 minute until the temperature rose again to be about 65° C. at about 6.25 minutes; thereby extending the charge time by about 1 minute as compared to the baseline results. The phase change material having 5 g of the PCC55-1000 during the same increase in temperature resulted in a leveling out of the temperature at about 55° C. for about 3.25 minutes until the temperature rose again to be about 65° C. at about 9.25 minutes; thereby extending the charge time by about 4 minutes as compared to the baseline results. Also, the phase change material having 10 g of the PCC55-1000 during the same increase in temperature resulted in a leveling out of the temperature at about 55° C. for about 6.75 minutes until the temperature rose again to be about 65° C. at about 13.5 minutes; thereby extending the charge time by about 8.25 minutes as compared to the baseline results.

As shown by the above results, not only did the incorporation of PCC55-1000 advantageously allow a leveling out of the increase in temperature of the cell at the melting point of PCC55-1000, the rates of temperature increase also decreased as the concentration of PCC55-1000 in the phase change material was increased. Thus, as additional amounts of PCC55-1000 were added to the phase change material, the temperature of the cell rose more slowly over time. Also, advantageously, the incorporation of PCC55-1000 into the phase change material advantageously allowed the temperature to level out at the melting point of the PCC55-1000 (due to the additional thermal energy being absorbed by the melting process of the PCC55-1000; however, the phase change material remains in a solid state despite the melting of the PCC55-1000. The leveling off in temperature at the melting point of the PCC55-1000 material is shown in FIGS. 8A-C to be dependent on the amount of PCC55-1000 used, and resulted in increases of the overall time to reach the maximum temperature of 65° C., which extends the charge time of the cell and results in increased capacity of the cell. For example, at the 2 C charge rate, an increase in 10 minutes provides 35% more capacity during a constant current charge mode. Further, it is possible to maximize battery life and gravimetric energy density by balancing the tradeoffs between the importance of fast charging and charge acceptance versus battery life and overall energy density; for example, it is possible to stop charging when the PCC material is entirely melted, which would thereby increase cycle life of the battery.

The following tables show analysis for the data gathered in FIGS. 8A-8C. Table 1 shows the percentage of increase in charge acceptance based on the ratio of the mass of the PCC55-1000 ("PCC") to the total mass of matrix including the cells ("Cell+PCC") for each of the charge rates of 1 C, 2 C, and 3 C.

TABLE 1

| | % PCC to Cell + PCC | | |
|---|---|---|---|
| Charge Rate | 1% | 7% | 13% |
| 1 | 3% | 17% | 35% |
| 2 | 5% | 17% | 35% |
| 3 | 5% | 20% | 42% |

Adding the extra mass of PCC decreases the energy density per cell. For example, for a 4.8 Ah 21700 lithium-ion cylindrical cell weighing 69 g, various amounts of PCC were added to the cell and the percentage of PCC per cell and the energy density of the Cell+PCC were calculated. These values are shown below in Table 2, based on a 2 C charge rate.

TABLE 2

| | Energy Density | |
|---|---|---|
| PCC | Wh/kg | % of 0 g |
| 0 g/cell | 253 | 100% |
| 1 g/cell | 249 | 99% |
| 5 g/cell | 235 | 93% |
| 10 g/cell | 221 | 87% |

Adding extra mass into the void areas of a battery module will decrease the total energy density of the module. In the following example, using a 4.8 Ah 21700 lithium-ion cylindrical cell weighing 69 g, various amounts of PCC were added to the module and the energy density was calculated for the module. These values are shown below in Table 3, based on a 2 C charge rate.

TABLE 3

| | Energy Density | |
|---|---|---|
| PCC | Wh/kg | % of 0 g |
| 0 g/cell | 198 | 100% |
| 1 g/cell | 196 | 99% |
| 5 g/cell | 187 | 94% |
| 10 g/cell | 178 | 90% |

As shown by Tables 1-3, adding extra mass due to the added PCC results in lower energy density; however, it can advantageously provide significantly improved high rate charge acceptance and increased battery life. Enhanced fast charge capability may override in importance the overall energy density of a battery when fast charge or high rate regenerative braking in an electric vehicle, for example, is required.

Also, the improvements in battery life can be advantageous. Should the usage pattern for the battery require frequent fast charging, the cycle life will be improved. For example, to improve cycle life, the charge can be terminated for a cell with PCC after the PCC fully melts at 55° C. under isothermal conditions. As a further example, at a 2 C charge rate the matrix with 10 g per cell of PCC will absorb more charge energy at a 55° C. maximum temperature than the matrix with 5 g per cell of PCC, and the matrix with 5 g per cell of PCC will absorb more charge energy at a 55° C. maximum temperature than the matrix with 2 g per cell of PCC.

Figure 9:
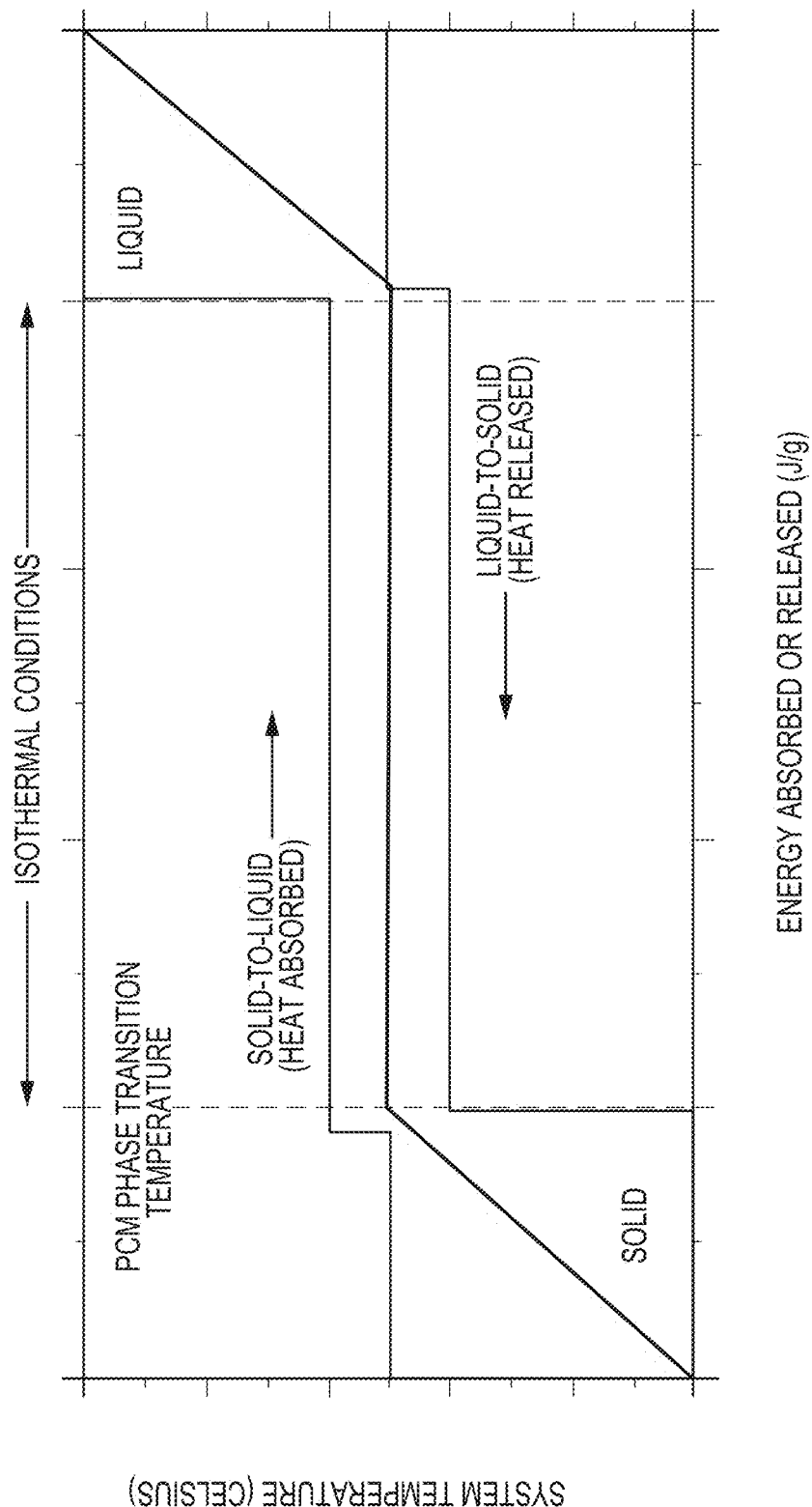
FIG. 9 shows a graph of energy absorbed and released and isothermal conditions of a phase change material per system temperature in accordance with embodiments of the present disclosure.

FIG. 9 shows a graph of energy absorbed and released and isothermal conditions of a phase change material per system temperature in accordance with embodiments of the present disclosure. In particular, FIG. 9 shows the temperature-sensitive storage and release of thermal energy that is possible with a phase change material. For example, the phase change material can store and dissipate energy in the form of heat, as shown in the Liquid-to-Solid and Solid-to-Liquid sections of the graph.

Figure 10:
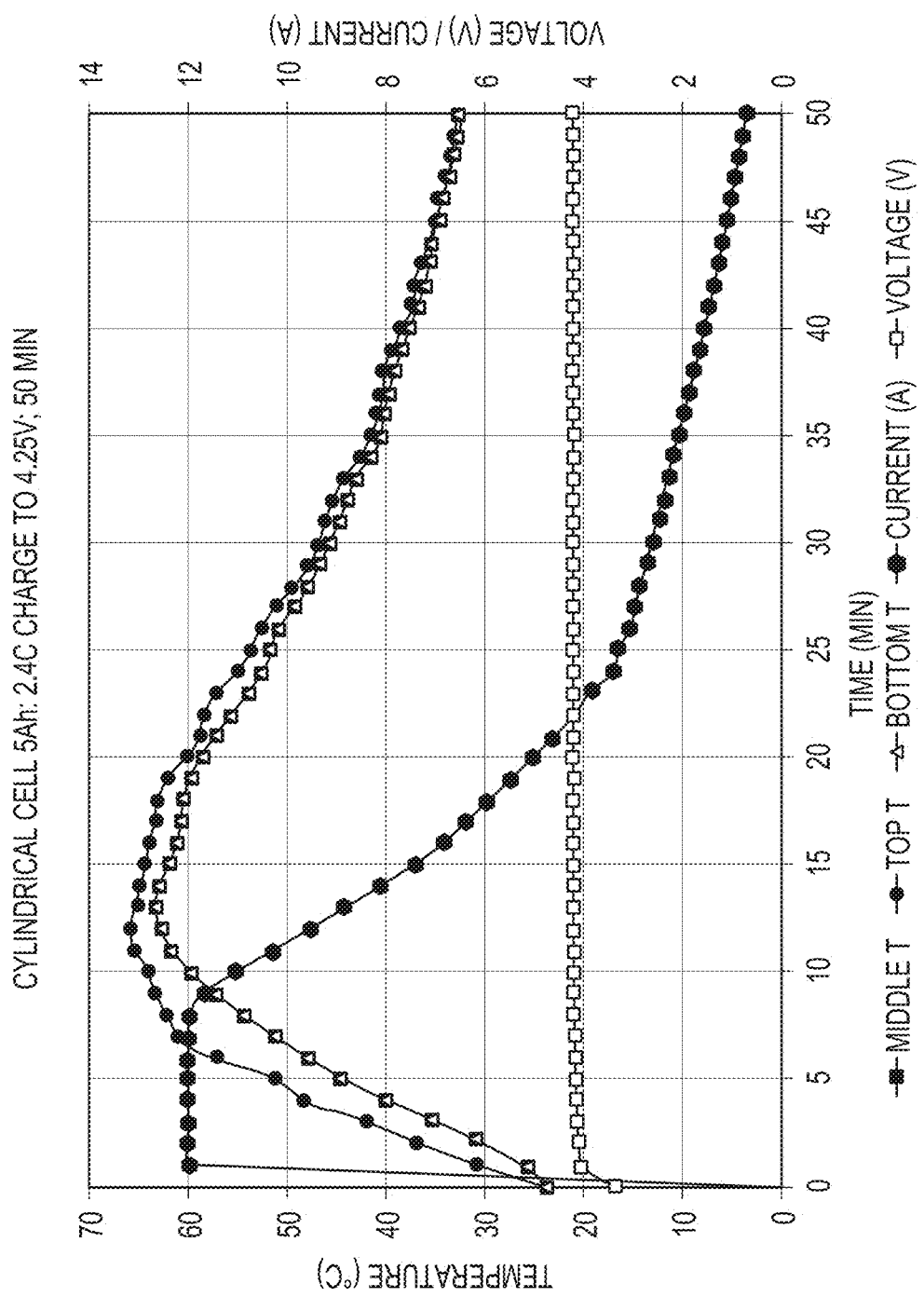
FIG. 10 shows a graph of voltage/current and temperature of a cell over time at a 2.4 C charge in accordance with embodiments of the present disclosure.

FIG. 10 shows a graph of voltage/current and temperature over time at a 2.4 C charge rate in accordance with embodiments of the present disclosure. In particular, FIG. 10 shows temperatures measured at different locations (middle, top, and bottom) in a cylindrical 5 Ah cell, charged to 4.25V for 50 minutes, together with the current and voltage during the charge. In FIG. 10, the temperatures of the top, middle, and bottom of the cell (referred to on the graph as top T, middle T, and bottom T, respectively) start at about 25° C. However, the middle and bottom temperatures reach a maximum of about 63° C. while the top temperature reaches a maximum of about 66° C., and the temperature of the top of the cell raises at a faster rate than the bottom and middle of the cell. For example, after 6 minutes the top section of the cell is about 9 to 10 degrees hotter than the middle or bottom section of the cell. Thus, as shown in FIG. 10, there is a substantially higher temperature in the top section (e.g., the header area) of the cell during a fast charge.

The exemplary systems and methods of this disclosure have been described in relation to a battery module 100 and a number of battery cells 208 in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a battery module, comprising: a plurality of energy storage cells, each of the energy storage cells having an upper side and a lower side, wherein the plurality of energy storage cells are arranged in a pattern with each energy storage cell being spaced apart from one another, and wherein the upper sides of each of the energy storage cells are adjacent to one another; a phase change composition (PCC) material comprising first through holes, wherein the first through holes are arranged in the pattern, and wherein an upper portion of each of the energy storage cells is positioned within a respective one of the first through holes and positioned adjacent to the PCC material; and a lightweight material adjacent to the PCC material, the lightweight material comprising second through holes, wherein the second through holes are arranged in the pattern, and wherein a lower portion of each of the energy storage cells is positioned within a respective one of the second through holes and positioned adjacent to the lightweight material. The PCC material and lightweight materials have differing densities.

Embodiments include an energy storage device, comprising: a plurality of energy storage cells, each of the energy storage cells having a upper side and a lower side, wherein the plurality of energy storage cells are arranged in a pattern with each energy storage cell being spaced apart from one another, and wherein the upper sides of each of the energy storage cells are adjacent to one another; a phase change composition (PCC) material comprising first through holes, wherein the first through holes are arranged in the pattern, and wherein a portion of each of the energy storage cells is located within a respective first through hole; and a lightweight material adjacent to the PCC material and surrounding at least another portion of each of the energy storage cells. The PCC material is closer to the upper side of the energy storage cells than the lightweight material.

Embodiments include a battery for an electric vehicle, comprising: a plurality of battery modules electrically interconnected with one another, wherein each battery module of the plurality of battery modules comprises: a plurality of energy storage cells, each of the energy storage cells having an upper side and a lower side, wherein the plurality of energy storage cells are arranged in a pattern with each energy storage cell being spaced apart from one another, and wherein the upper sides of each of the energy storage cells are adjacent to one another; a phase change composition (PCC) material comprising through holes, wherein the through holes are arranged in the pattern, and wherein a portion of each of the energy storage cells is within a respective through hole; and a lightweight material adjacent to the PCC material and surrounding at least another portion of each of the energy storage cells. The PCC material is closer to the upper side of the energy storage cells than the lightweight material. The lightweight material has a lower density than the PCC material. The PCC and lightweight materials have differing melting points.

Aspects of the above battery module include wherein the PCC material is a pre-formed layer, wherein the lightweight material is a pre-formed layer, and wherein the PCC and lightweight materials have differing chemical compositions and differing thermal properties.

Aspects of the above battery module include wherein the PCC material is a single layer, wherein the lightweight material is a single layer, wherein a bottom surface of the PCC material is in direct and continuous contact with a upper surface of the lightweight material wherein a surface of the PCC material opposing the PCC material surface in contact with the lightweight material is closer to a top of the energy storage cells than a selected surface of the lightweight material, and wherein a surface of the lightweight material opposing the lightweight material surface in contact with the PCC material is closer to a bottom of the energy storage cells than a selected surface of the PCC material.

Aspects of the above battery module include a carrier comprising a plurality of sidewalls and a lower surface, the carrier including an internal void, wherein the lower portion of each of the energy storage cells is within the internal void, and wherein the lightweight material is disposed in the internal void.

Aspects of the above battery module include wherein the lightweight material is a structural adhesive that mechanically couples each of the energy storage cells.

Aspects of the above battery module include wherein the lightweight material mechanically couples each of the energy storage cells, and wherein the lightweight material is mechanically coupled to the PCC material.

Aspects of the above battery module include wherein the PCC material is in direct contact with a upper surface of the lightweight material in an area between each of the energy storage cells.

Aspects of the above battery module include wherein the PCC material has a first height that extends along a first part of sides of each of the energy storage cells, wherein the lightweight material has a second height that extends along a second part of the sides of each of the energy storage cells, wherein the first part and the second part are directly adjacent to one another, and wherein the first height is less than about 50 percent of a total height of each of the energy storage cells.

Aspects of the above battery module include wherein the first height is from about 40 percent to about 5% of the second height.

Aspects of the above battery module include wherein a volume of the PCC material compared to a volume of the lightweight material is determined based on a desired recharging temperature gradient in the energy storage cells and wherein the total volume of the PCC material is less than a total volume of the lightweight material.

Aspects of the above energy storage device include wherein the PCC material is a pre-formed layer, wherein the lightweight material is a pre-formed layer comprising corresponding second through holes arranged in the pattern, and wherein the PCC and lightweight materials have differing chemical compositions and differing thermal properties.

Aspects of the above energy storage device include wherein the PCC material is a single layer, wherein the lightweight material is a single layer comprising corresponding second through holes arranged in the pattern, wherein a bottom surface of the PCC material is in direct and continuous contact with a upper surface of the lightweight material, wherein a surface of the PCC material opposing the PCC material surface in contact with the lightweight material is closer to a top of the energy storage cells than a selected surface of the lightweight material, and wherein a surface of the lightweight material opposing the lightweight material surface in contact with the PCC material is closer to a bottom of the energy storage cells than a selected surface of the PCC material.

Aspects of the above energy storage device include a carrier comprising a plurality of sidewalls and a lower surface, the carrier including an internal void, wherein the at least another portion of each of the energy storage cells is within the internal void, and wherein the lightweight material is disposed in the internal void.

Aspects of the above energy storage device include wherein the lightweight material is a structural adhesive that mechanically couples each of the energy storage cells.

Aspects of the above energy storage device include wherein the lightweight material mechanically couples each of the energy storage cells, and wherein the lightweight material is mechanically coupled to the PCC material.

Aspects of the above energy storage device include wherein the PCC material has a first height that extends along a first part of sides of each of the energy storage cells, wherein the lightweight material has a second height that extends along a second part of the sides of each of the energy storage cells, wherein the first part and the second part are directly adjacent to one another, and wherein the first height is from about 40 percent to about 10 percent of the second height.

Aspects of the above energy storage device include wherein the first height is less than about 50 percent of a total height of the cell.

Aspects of the above energy storage device include wherein a volume of the PCC material compared to a volume of the lightweight material is determined based on a desired recharging temperature gradient in the energy storage cells and wherein the total volume of the PCC material is less than a total volume of the lightweight material.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The term "adhesive" refers to any substance applied to one surface, or both surfaces, of two separate items that binds them together and resists their separation. The adhesive may be non-reactive (e.g., drying, pressure sensitive, contact, or hot) or reactive (e.g., multi-part, pre-mixed, frozen, or one-part) and may be natural or synthetic. It can rely on one or more mechanisms of adhesion, such as a mechanical mechanism and/or chemical mechanism. The surface(s) to be bonded may be activated prior to adhesive application by any surface activation technique, such as plasma activation, flame treatment, and wet chemistry priming.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The term "chemical properties" refer to one or more of chemical composition, oxidation, flammability, heat of combustion, enthalpy of formation, and chemical stability under specific conditions.

The terms "determine," "calculate," "compute," and variations thereof, as used herein, are used interchangeably and include any type of methodology, process, mathematical operation or technique.

The term "thermal properties" refer to one or more of thermal conductivity, thermal diffusivity, specific heat, thermal expansion coefficient, and creep resistance.

The term "electrical insulator" refers to a material or combination of materials whose internal electrical charges do not flow freely; very little electric current will flow through the material(s) under the influence of an electric field. Electrical insulators have higher resistivity than semiconductors or conductors. The electrical insulator material(s) may be natural or synthetic.

What is claimed is:

1. A battery module, comprising:
a plurality of energy storage cells, each of the energy storage cells in the plurality of energy storage cells having an upper side and a lower side, wherein the plurality of energy storage cells are arranged in a pattern with each energy storage cell in the plurality of energy storage cells being spaced apart from one another, and wherein the upper sides of each of the energy storage cells in the plurality of energy storage cells are adjacent to one another;
a phase change composition (PCC) material comprising first through holes, wherein the first through holes are arranged in the pattern, and wherein an upper portion of each of the energy storage cells in the plurality of energy storage cells is positioned within a respective one of the first through holes and positioned adjacent to the PCC material; and a lightweight material adjacent to the PCC material, the lightweight material comprising second through holes, wherein the second through holes are arranged in the pattern, and wherein a lower portion of each of the energy storage cells in the plurality of energy storage cells is positioned within a respective one of the second through holes and positioned adjacent to the lightweight material, wherein the PCC material and the lightweight material have differing densities, wherein the PCC material is a single layer, wherein the lightweight material is a single layer, wherein a bottom surface of the PCC material is in direct and continuous contact with an upper surface of the lightweight material, wherein a surface of the PCC material opposing the PCC material bottom surface in contact with a surface of the lightweight material is closer to a top of the plurality of energy storage cells than a selected surface of the lightweight material, wherein a surface of the lightweight material opposing the lightweight material surface in contact with the PCC material is closer to a bottom of the plurality of energy storage cells than a selected surface of the PCC material, and wherein the PCC material has a first height that extends along a first part of sides of each of the energy storage cells in the plurality of energy storage cells, wherein the lightweight material has a second height that extends along a second part of the sides of each of the energy storage cells in the plurality of energy storage cells, wherein the first part of the sides and the second part of the sides are directly adjacent to one another, and wherein the first height is from about 40 percent to about 5 percent of the second height.

2. The battery module of claim 1, wherein the PCC material is a pre-formed layer, wherein the lightweight material is a pre-formed layer, and wherein the PCC material and the lightweight material have differing chemical compositions and differing thermal properties.

3. The battery module of claim 1, further comprising a carrier comprising a plurality of sidewalls and a lower surface, the carrier including an internal void, wherein the lower portion of each of the energy storage cells in the plurality of energy storage cells is within the internal void, and wherein the lightweight material is disposed in the internal void.

4. The battery module of claim 3, wherein the lightweight material is a structural adhesive that mechanically couples each of the energy storage cells in the plurality of energy storage cells.

5. The battery module of claim 3, wherein the lightweight material mechanically couples each of the energy storage cells in the plurality of energy storage cells, and wherein the lightweight material is mechanically coupled to the PCC material.

6. The battery module of claim 3, wherein the PCC material surface in contact with the lightweight material is in an area between each of the energy storage cells in the plurality of energy storage cells.

7. The battery module of claim 1, wherein a volume of the PCC material compared to a volume of the lightweight material is determined based on a desired recharging temperature gradient in the plurality of energy storage cells and wherein a total volume of the PCC material is less than a total volume of the lightweight material.

8. An energy storage device, comprising:

a plurality of energy storage cells, each of the energy storage cells in the plurality of energy storage cells having an upper side and a lower side, wherein the plurality of energy storage cells are arranged in a pattern with each energy storage cell in the plurality of energy storage cells being spaced apart from one another, and wherein the upper sides of each of the energy storage cells in the plurality of energy storage cells are adjacent to one another;

a phase change composition (PCC) material comprising first through holes, wherein the first through holes are arranged in the pattern, and wherein a lower portion of each of the energy storage cells in the plurality of energy storage cells is positioned within a respective one of second through holes and positioned adjacent to a lightweight material, wherein the PCC material and the lightweight material have differing densities, wherein the PCC material is a single layer, wherein the lightweight material is a single layer, wherein a bottom surface of the PCC material is in direct and continuous contact with an upper surface of the lightweight material, wherein a surface of the PCC material opposing the PCC material bottom surface in contact with a surface of the lightweight material is closer to a top of the plurality of energy storage cells than a selected surface of the lightweight material, wherein a surface of the lightweight material opposing the lightweight material surface in contact with the PCC material is closer to a bottom of the plurality of energy storage cells than a selected surface of the PCC material, and wherein the PCC material has a first height that extends along a first part of sides of each of the energy storage cells in the plurality of energy storage cells, wherein the lightweight material has a second height that extends along a second part of the sides of each of the energy storage cells in the plurality of energy storage cells, wherein the first part of the sides and the second part of the sides are directly adjacent to one another, and wherein the first height is from about 40 percent to about 5 percent of the second height.

9. The energy storage device of claim 8, wherein the PCC material is a pre-formed layer, wherein the lightweight material is a pre-formed layer, and wherein the PCC material and the lightweight material have differing chemical compositions and differing thermal properties.

10. The energy storage device of claim 8, further comprising a carrier comprising a plurality of sidewalls and a lower surface, the carrier including an internal void, wherein at least another portion of each of the energy storage cells in the plurality of energy storage cells is within the internal void, and wherein the lightweight material is disposed in the internal void.

11. The energy storage device of claim 10, wherein the lightweight material is a structural adhesive that mechanically couples each of the energy storage cells in the plurality of energy storage cells.

12. The energy storage device of claim 10, wherein the lightweight material mechanically couples each of the energy storage cells in the plurality of energy storage cells, and wherein the lightweight material is mechanically coupled to the PCC material.

13. The energy storage device of claim 8, wherein a volume of the PCC material compared to a volume of the lightweight material is determined based on a desired recharging temperature gradient in the plurality of energy storage cells and wherein a total volume of the PCC material is less than a total volume of the lightweight material.

14. A battery for an electric vehicle, comprising:
   a plurality of battery modules electrically interconnected with one another, wherein each battery module of the plurality of battery modules comprises:
   a plurality of energy storage cells, each of the energy storage cells in the plurality of energy storage cells having an upper side and a lower side, wherein the plurality of energy storage cells are arranged in a pattern with each energy storage cell in the plurality of energy storage cells being spaced apart from one another, and wherein the upper sides of each of the energy storage cells in the plurality of energy storage cells are adjacent to one another;
   a phase change composition (PCC) material comprising first through holes, wherein the first through holes are arranged in the pattern, and wherein a lower portion of each of the energy storage cells in the plurality of energy storage cells is positioned within a respective one of second through holes and positioned adjacent to a lightweight material,
   wherein the PCC material and the lightweight material have differing densities,
   wherein the PCC material is a single layer, wherein the lightweight material is a single layer, wherein a bottom surface of the PCC material is in direct and continuous contact with an upper surface of the lightweight material, wherein a surface of the PCC material opposing the PCC material bottom surface in contact with a surface of the lightweight material is closer to a top of the plurality of energy storage cells than a selected surface of the lightweight material, wherein a surface of the lightweight material opposing the lightweight material surface in contact with the PCC material is closer to a bottom of the plurality of energy storage cells than a selected surface of the PCC material, and
   wherein the PCC material has a first height that extends along a first part of sides of each of the energy storage cells in the plurality of energy storage cells, wherein the lightweight material has a second height that extends along a second part of the sides of each of the energy storage cells in the plurality of energy storage cells, wherein the first part of the sides and the second part of the sides are directly adjacent to one another, and wherein the first height is from about 40 percent to about 5 percent of the second height.

* * * * *